(12) United States Patent
Chiba et al.

(10) Patent No.: US 11,168,974 B2
(45) Date of Patent: Nov. 9, 2021

(54) DIELECTRIC ELASTOMER SENSOR SYSTEM AND DIELECTRIC ELASTOMER SENSOR ELEMENT

(71) Applicants: Seiki Chiba, Tokyo (JP); Mikio Waki, Sakura (JP); ZEON CORPORATION, Tokyo (JP)

(72) Inventors: Seiki Chiba, Tokyo (JP); Mikio Waki, Sakura (JP); Mitsuaki Ito, Ageo (JP); Makoto Sawada, Ageo (JP)

(73) Assignees: Seiki Chiba, Tokyo (JP); Mikio Waki, Sakura (JP); ZEON CORPORATION, Tokyo (JP)

( * ) Notice: Subject to any disclaimer, the term of this patent is extended or adjusted under 35 U.S.C. 154(b) by 212 days.

(21) Appl. No.: 16/488,712

(22) PCT Filed: Feb. 23, 2018

(86) PCT No.: PCT/JP2018/006631
§ 371 (c)(1),
(2) Date: Aug. 26, 2019

(87) PCT Pub. No.: WO2018/163855
PCT Pub. Date: Sep. 13, 2018

(65) Prior Publication Data
US 2020/0011649 A1    Jan. 9, 2020

(30) Foreign Application Priority Data

Mar. 9, 2017 (JP) .............................. JP2017-044830

(51) Int. Cl.
*G01L 1/14* (2006.01)
*G01B 7/16* (2006.01)
*G01D 5/241* (2006.01)

(52) U.S. Cl.
CPC ............... *G01B 7/16* (2013.01); *G01D 5/241* (2013.01); *G01L 1/14* (2013.01)

(58) Field of Classification Search
CPC ............. G01B 7/16; G01D 5/241; G01L 1/14
See application file for complete search history.

(56) References Cited

U.S. PATENT DOCUMENTS 8,598,893 B2    12/2013  Camus
10,365,171 B2 *  7/2019  Kaneko .................... G01B 7/22
(Continued)

FOREIGN PATENT DOCUMENTS

EP    3115740 A1    1/2017
JP    2012518384 A  8/2012
(Continued)

OTHER PUBLICATIONS

Mar. 27, 2018, International Search Report issued in the International Patent Application No. PCT/JP2018/006631.
(Continued)

*Primary Examiner* — Max H Noori
(74) *Attorney, Agent, or Firm* — Kenja IP Law PC

(57) ABSTRACT

A dielectric elastomer sensor system A1 is provided with an oscillation circuit 1 including a dielectric elastomer sensor element 11 having a dielectric elastomer layer 111 and a pair of electrode layers 112 sandwiching the dielectric elastomer layer 111, and with a determination circuit 2 configured to determine a change in a capacitance of the dielectric elastomer sensor element 11, based on an output signal from the oscillation circuit 1. The dielectric elastomer sensor element 11 changes in capacitance due to deformation caused by external forces of at least two mutually different directions. Such a configuration enables provision of a multifunctional dielectric elastomer sensor system and dielectric elastomer sensor element.

6 Claims, 9 Drawing Sheets

(56) References Cited

U.S. PATENT DOCUMENTS

| | | | |
|---|---|---|---|
| 11,081,976 B2* | 8/2021 | Chiba | B06B 1/0292 |
| 2005/0000298 A1 | 1/2005 | Pfeifer et al. | |
| 2009/0015270 A1* | 1/2009 | Hayakawa | G01L 1/142 |
| | | | 324/686 |
| 2011/0006787 A1 | 1/2011 | Kadono | |
| 2012/0086366 A1 | 4/2012 | Anderson et al. | |
| 2016/0025669 A1* | 1/2016 | Sun | G01N 27/305 |
| | | | 205/790.5 |
| 2017/0199022 A1* | 7/2017 | Anderson | H03K 17/955 |
| 2021/0022510 A1* | 1/2021 | Chiba | H02N 11/00 |

FOREIGN PATENT DOCUMENTS

| | | | |
|---|---|---|---|
| JP | 5326042 B2 | 10/2013 | |
| WO | 2004079832 A2 | 9/2004 | |
| WO | 2016003293 A1 | 1/2016 | |
| WO | 2016036261 A1 | 3/2016 | |

OTHER PUBLICATIONS

Dec. 8, 2020, the Extended European Search Report issued by the European Patent Office in the corresponding European Patent Application No. 18763347.4.

Allan Joshua Veale et al., Dielectric elastomer strain and pressure sensing enable reactive soft fluidic muscles, Electroactive Polymer Actuators and Devices (EAPAD), 2016, vol. 9798.

Baek-Chul Kim et al., A dual axis shear force film sensor for robotic tactile applications, Electroactive Polymer Actuators and Devices (EAPAD), 2011, vol. 7976.

Daniel Xu et al., Localised strain sensing of dielectric elastomers in a stretchable soft-touch musical keyboard, Electroactive Polymer Actuators and Devices (EAPAD), 2015, vol. 9430.

Holger Böse et al., Applications of pressure-sensitive dielectric elastomer sensors, Electroactive Polymer Actuators and Devices (EAPAD), 2016, vol. 9798.

\* cited by examiner

DIELECTRIC ELASTOMER SENSOR SYSTEM AND DIELECTRIC ELASTOMER SENSOR ELEMENT

TECHNICAL FIELD

The present invention relates to a dielectric elastomer sensor system and a dielectric elastomer sensor element.

BACKGROUND ART

Development of dielectric elastomer elements having a dielectric elastomer layer and a pair of electrode layers that sandwich the dielectric elastomer layer is ongoing in the respective fields of drive applications, power generation applications, and sensor applications. Patent Document 1 discloses a dielectric elastomer sensor system in which a dielectric elastomer element is used in sensor applications. In this dielectric elastomer sensor system, as shown in FIG. 1, the dielectric elastomer element elongates or contracts due to an external force. Due to this deformation, the capacitance of a capacitor formed by the pair of electrode layers changes. An external force or the like acting on the dielectric elastomer is detected, by determining this change in capacitance using a determination circuit or the like.

Various cases are envisioned in applications for detecting an external force or the like. For example, in the case where external forces act on a certain position from a plurality of directions, problems occur such as being forced to densely provide the abovementioned dielectric elastomer elements of around the same number as the number of directions in which detection is desired.

PRIOR ART DOCUMENTS

Patent Document

Patent Document 1: JP-A-2012-518384

SUMMARY OF THE INVENTION

Problem to be Solved by the Invention

The present invention has been conceived under the abovementioned circumstances, and an object thereof is to provide a more multifunctional dielectric elastomer sensor system and dielectric elastomer element.

Means for Solving the Problem

A dielectric elastomer sensor system provided according to a first aspect of the present invention includes an oscillation circuit including a dielectric elastomer sensor element having a sensor body constituted by a dielectric elastomer layer and a pair of electrode layers that sandwich the dielectric elastomer layer, and a determination circuit configured to determine a change in a capacitance of the dielectric elastomer sensor element, based on an output signal from the oscillation circuit, the dielectric elastomer sensor element changing in capacitance due to deformation caused by external forces of at least two mutually different directions.

In a preferred embodiment of the present invention, the dielectric elastomer sensor system further includes an intermediate circuit including a filter circuit that attenuates a predetermined frequency of the output signal of the oscillation circuit, and configured to output the output signal of the oscillation circuit processed by the filter circuit to the determination circuit.

In a preferred embodiment of the present invention, the dielectric elastomer layer has a circular ring-shaped cross-section.

In a preferred embodiment of the present invention, the dielectric elastomer sensor element has a cylindrical shape with one of the electrode layers on an inner circumferential side and the other electrode layer on an outer circumferential side, and changes in capacitance with at least two types of deformation, out of elongation in an axial direction, compression deformation in the axial direction, twisting deformation, bending deformation, and depression deformation of an outer circumferential surface.

In a preferred embodiment of the present invention, the dielectric elastomer sensor element is formed in a circular ring shape in plan view, further includes an external force action member provided in a middle opening part of the dielectric elastomer sensor element and whose outer edge is integrally formed with an inner edge of the middle opening part, and changes in capacitance with at least two types of deformation, out of deformation of the sensor body caused by rising or falling of the external force action member, deformation of the sensor body caused by inclination of the external force action member, and deformation of the sensor body caused by rotation of the external force action member.

In a preferred embodiment of the present invention, the dielectric elastomer sensor element is integrally formed with a planer detection object, and changes in capacitance with at least two types of deformation, out of stretch deformation of the detection object in a planer direction, depression deformation of the detection object, and flexural deformation of the detection object.

A dielectric elastomer sensor element provided according to a second aspect of the present invention includes a sensor body constituted by a dielectric elastomer layer and a pair of electrode layers that sandwich the dielectric elastomer layer, the dielectric elastomer sensor element changing in capacitance due to deformation caused by external forces of at least two mutually different directions.

In a preferred embodiment of the present invention, the sensor body has a cylindrical shape with one of the electrode layers on an inner circumferential side and the other electrode layer on an outer circumferential side, and changes in capacitance with at least two types of deformation, out of elongation in an axial direction, compression deformation in the axial direction, twisting deformation, bending deformation, and depression deformation of an outer circumferential surface.

In a preferred embodiment of the present invention, the sensor body is formed in a circular ring shape in plan view, further includes an external force action member provided in a middle opening part of the sensor body and whose outer edge is integrally formed with an inner edge of the middle opening part, and changes in capacitance with at least two types of deformation, out of deformation of the sensor body caused by rising or falling of the external force action member, deformation of the sensor body caused by inclination of the external force action member, and deformation of the sensor body caused by rotation of the external force action member.

In a preferred embodiment of the present invention, the dielectric elastomer sensor element is integrally formed with a planer detection object, and changes in capacitance with at least two types of deformation, out of stretch deformation of the detection object in a planer direction, depression deformation of the detection object, and flexural deformation of the detection object.

Other features and advantages of the present invention will become apparent from the detailed description given below with reference to the accompanying drawings.

MODE FOR CARRYING OUT THE INVENTION

Hereinafter, preferred embodiments of the present invention will be specifically described, with reference to the drawings.

Figure 1:
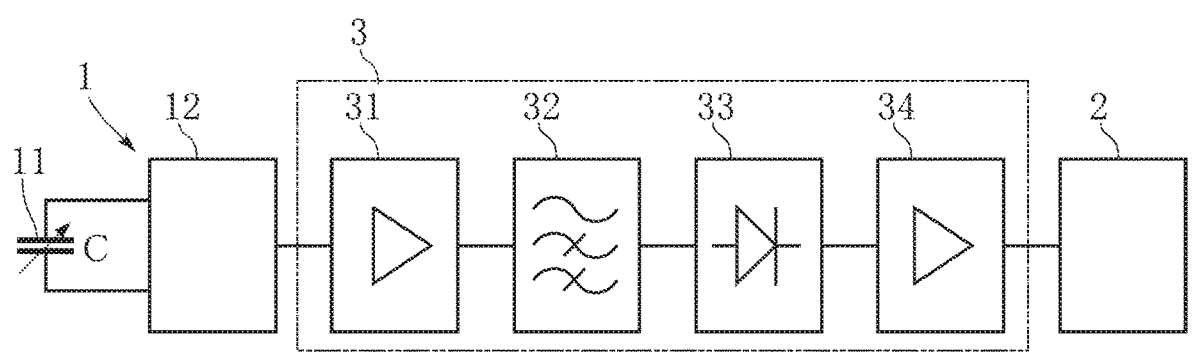
FIG. 1 is a system configuration diagram schematically showing a dielectric elastomer sensor system that is based on a first embodiment of the present invention.

FIG. 1 shows a dielectric elastomer sensor system that is based on a first embodiment of the present invention. A dielectric elastomer sensor system A1 of the present embodiment is provided with an oscillation circuit 1, a determination circuit 2, and an intermediate circuit 3. The dielectric elastomer sensor system A1 is a system for detecting a deformation state of a dielectric elastomer sensor element 11 included in the oscillation circuit 1 (state in which an external force is acting thereon), and it is intended to detect the action of forces of at least two or more mutually different directions.

The oscillation circuit 1 includes the dielectric elastomer sensor element 11 and an oscillation drive unit 12, and outputs an AC electrical signal. The dielectric elastomer sensor element 11 is regarded and used as a variable capacitor. The oscillation drive unit 12 constitutes a conventionally known CR oscillation circuit, LC oscillation circuit, oscillation circuit using a timer IC or the like, together with a power source for generating an AC electrical signal and the dielectric elastomer sensor element 11 serving as a variable capacitor, for example. The frequency of the AC electrical signal that is output changes with changes in the capacitance of the dielectric elastomer sensor element 11.

Figure 2:
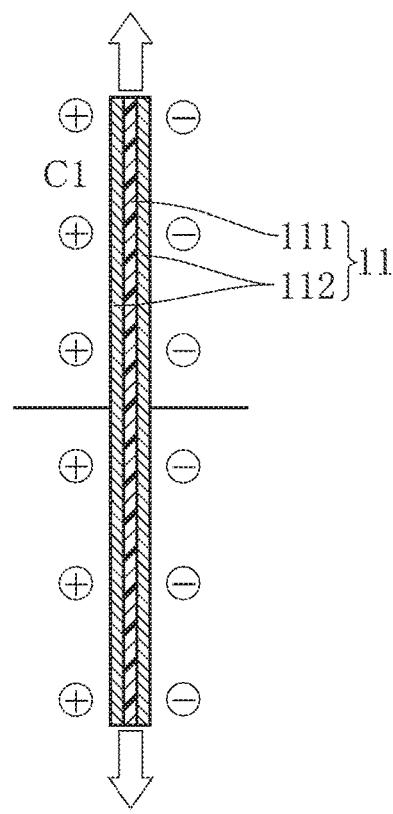
FIG. 2 is a schematic cross-sectional view showing one state of a dielectric elastomer sensor element of the dielectric elastomer sensor system of FIG. 1.
Figure 3:
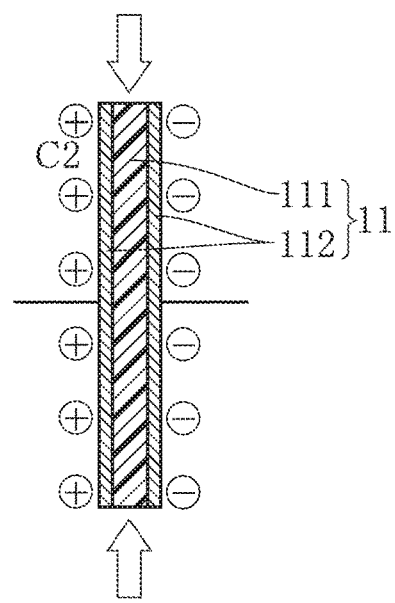
FIG. 3 is a schematic cross-sectional view showing another state of the dielectric elastomer sensor element of the dielectric elastomer sensor system of FIG. 1.

FIGS. 2 to 3 schematically represent the dielectric elastomer sensor element 11. The dielectric elastomer sensor element 11 has a dielectric elastomer layer 111 and a pair of electrode layers 112. Note that the dielectric elastomer layer 111 and the pair of electrode layers 112 constitute a sensor body in the present invention.

The dielectric elastomer layer 111 is required to be elastically deformable and have high insulation strength. Although the material of such a dielectric elastomer layer 111 is not particularly limited, a silicone elastomer and an acrylic elastomer, for example, are given as preferred examples.

The pair of electrode layers 112 sandwich the dielectric elastomer layer 111, and are parts that function as electrodes of the capacitor. The electrode layers 112 have conductivity, and are formed using an elastically deformable material that can conform to the elastic deformation of the dielectric elastomer layer 111. A material obtained by mixing an elastically deformable main material with a filler that provides conductivity is given as an example of such a material. Carbon nanotubes, for example, are given as a preferred example of the filler.

The dielectric elastomer sensor element 11 shown in FIG. 2 is in a state where an external force that pulls the dielectric elastomer sensor element 11 in the up-down direction in the diagram is applied. This dielectric elastomer sensor element 11 is elongated in the up-down direction. That is, the dielectric elastomer layer 111 is elongated in the up-down direction, and the thickness (dimension in the left-right direction in the diagram) has decreased. The pair of electrode layers 112 can favorably elongate and contract together with the dielectric elastomer layer 111. Thus, the pair of electrode layers 112 elongate in the up-down direction, and the distance therebetween (distance in the left-right direction in the diagram) decreases. As a result, the electrode area of the dielectric elastomer sensor element 11 serving as a capacitor increases, and the inter-electrode distance decreases. Accordingly, a capacitance C1 in FIG. 2 becomes larger than an initial capacitance C0 of the dielectric elastomer sensor element 11 in a state where an external force is not applied.

On the other hand, the dielectric elastomer sensor element 11 shown in FIG. 3 is in a state where an external force that compresses the dielectric elastomer sensor element 11 in the up-down direction in the diagram is applied. In this case, the pair of electrode layers 112 contract in the up-down direction, and the distance therebetween (distance in the left-right direction in the diagram) increases. As a result, a capacitance C2 of the dielectric elastomer sensor element 11 serving as a capacitor becomes smaller than the initial capacitance C0.

As shown in FIGS. 2 and 3, when an external force applied to the dielectric elastomer sensor element 11 deforms the dielectric elastomer layer 111, and the area of the pair of electrode layers 112 and the distance therebetween change due to this deformation, the capacitance C of the dielectric elastomer sensor element 11 changes. This change in the capacitance C causes the frequency of the AC electrical signal of the abovementioned oscillation circuit 1 to change.

The determination circuit 2 shown in FIG. 1 is for determining a change in the capacitance C of the dielectric elastomer sensor element 11, based on the output signal of the oscillation circuit 1. The configuration of the determination circuit 2 is not particularly limited, and need only be capable of determining the relationship between the output signal of the oscillation circuit 1 and the capacitance C, based on various conventionally known techniques. The specific configuration of the determination circuit 2 is appropriately selected according to whether or not a circuit for processing the output signal from the oscillation circuit 1 as appropriate, such as the intermediate circuit 3 described later, is provided and the configuration thereof. The determination circuit 2 is exemplified by a microcomputer, an A/D conversion IC, a comparator, an oscilloscope, and the like. In the illustrated example, the determination circuit 2 is a circuit that, in the case where the output signal of the oscillation circuit 1 is converted into an electric signal (hereinafter, DC electrical signal) that fluctuates periodically in one polarity, determines a change in the capacitance C of the dielectric elastomer sensor element 11 from the frequency of this DC electrical signal. That is, the determination circuit 2 determines, from the frequency corresponding to the initial capacitance C0 of the dielectric elastomer sensor element 11, that the capacitance C of the dielectric elastomer sensor element 11 has changed, in the case where the frequency of the DC electrical signal serving as the output signal of the oscillation circuit 1 changes. Determination criteria such as thresholds may be employed as appropriate in this determination.

The intermediate circuit 3 is for processing the output signal of the oscillation circuit 1 into a signal suitable for the determination by the determination circuit 2. In the case of a configuration in which the determination circuit 2 is capable of directly determining the output signal of the oscillation circuit 1, the intermediate circuit 3 may be omitted, although in appropriately determining the relationship between the frequency of the AC electrical signal, which is the output signal of the oscillation circuit 1, and the capacitance C, it is preferable and realistic to provide an intermediate circuit 3 including a filter circuit 32. In the illustrated example, a configuration is adopted in which the intermediate circuit 3 is provided with an AC amplification circuit 31, the filter circuit 32, a detection circuit 33 and a DC amplification circuit 34, and converts the output signal of the oscillation circuit 1 from an AC electrical signal into a DC electrical signal.

The AC amplification circuit 31 extends the dynamic range, by amplifying the AC electrical signal from the oscillation circuit 1. In the case where the signal level of the AC electrical signal from the oscillation circuit 1 is sufficient, the AC amplification circuit 31 may be omitted. The AC amplification circuit 31 is not particularly limited, and is exemplified by a transistor, a FET, an operational amplifier and the like, for example.

The filter circuit 32 passes signals of a desired frequency band that are included in the AC electrical signals of the oscillation circuit 1, and attenuates or blocks signals of unwanted frequency bands. The filter circuit 32 is not particularly limited, and is exemplified by a high-pass filter, a low-pass filter, a band-pass filter, a band elimination filter and the like, for example. The case where a high-pass filter is employed is shown in the illustrated example. Note that the specific configuration of the filter circuit 32 is selected according to the variation range of the DC voltage that is output from the detection circuit 33.

The detection circuit 33 is for converting the output signal of the oscillation circuit 1 serving as the AC electrical signal that is output from the filter circuit 32 into a direct current. The detection circuit 33 is not particularly limited, and is exemplified by a half wave rectifier circuit or a full wave rectifier circuit that uses a diode, for example. A detection circuit 33 having a configuration with favorable response characteristics is preferably used in speeding up the determination of the capacitance C of the dielectric elastomer sensor element 11.

The DC amplification circuit 34 is for amplifying the output signal of the oscillation circuit 1 serving as the DC electrical signal that is output from the detection circuit 33 to a signal level suitable for the determination by the determination circuit 2. Note that in the case where the level of the DC electrical signal from the detection circuit 33 is sufficient, the DC amplification circuit 34 may be omitted.

Figure 4:
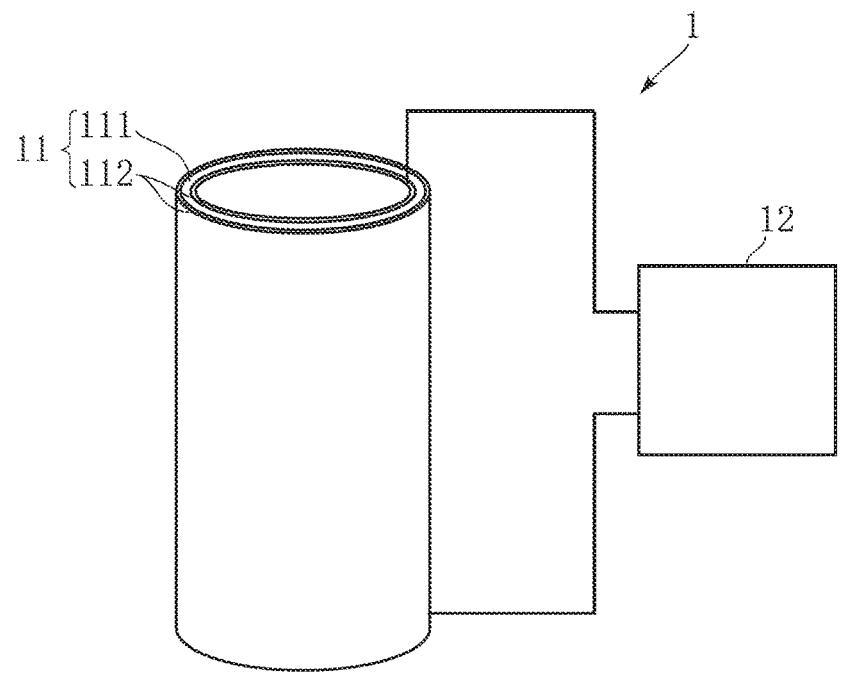
FIG. 4 is a perspective diagram showing an example of an oscillation circuit of the dielectric elastomer sensor system of FIG. 1.
Figure 5:
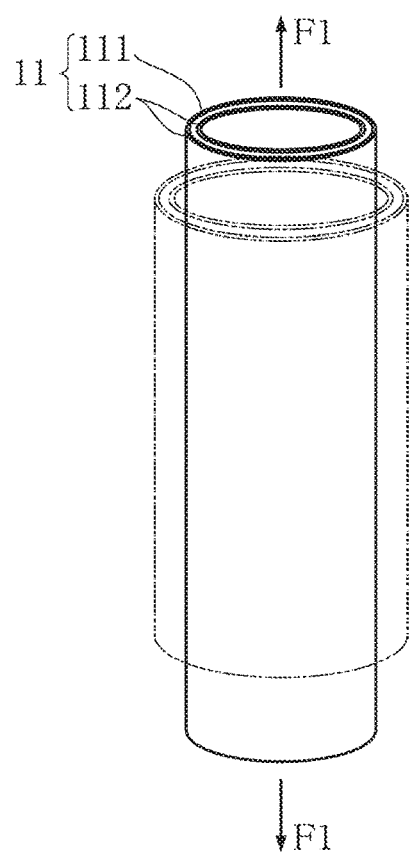
FIG. 5 is a perspective diagram showing a state in which one example of the dielectric elastomer sensor element of the dielectric elastomer sensor system of FIG. 1 receives an external force.

FIG. 4 shows an example of the oscillation circuit 1 in the dielectric elastomer sensor system A1. In this diagram, the dielectric elastomer sensor element 11 is shown in perspective view for convenience of understanding. In the dielectric elastomer sensor element 11 of this example, the dielectric elastomer layer 111 is formed in a cylindrical shape whose axial direction is the up-down direction in the diagram, and has a circular ring-shaped cross-section. The pair of electrode layers 112 are separately provided on the inner circumferential surface and outer circumferential surface of the dielectric elastomer layer 111.

FIGS. 5 to 8 illustrate the case where the capacitance C changes due to the dielectric elastomer sensor element 11 receiving an external force. In the example shown in FIG. 5, an external force F1 that pulls the dielectric elastomer sensor element 11 in the up-down direction in the diagram (axial direction) is applied. In response to the external force F1, the dielectric elastomer layer 111 deforms, and the size and relative distance of the pair of electrode layers 112 change. The capacitance C of the dielectric elastomer sensor element 11 thereby changes, and the frequency of the AC electrical signal serving as the output signal of the oscillation circuit 1 changes. The determination circuit 2 determines that the capacitance C has changed based on the output signal of the oscillation circuit 1 processed by the abovementioned intermediate circuit 3. The application of an external force deforming the dielectric elastomer sensor element 11 can be recognized when it is determined that the capacitance C has changed. Note that, in this example, the capacitance C is thought to become larger than the initial capacitance C0.

Figure 6:
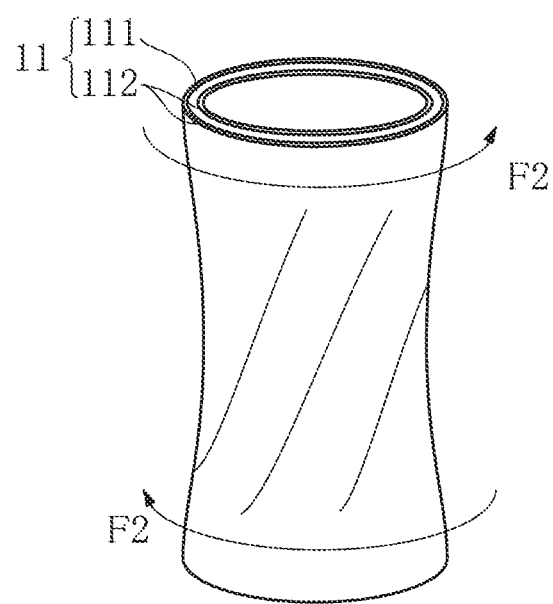
FIG. 6 is a perspective diagram showing a state in which one example of the dielectric elastomer sensor element of the dielectric elastomer sensor system of FIG. 1 receives another external force.

In the example shown in FIG. 6, an external force F2 (so-called twisting moment) that turns the upper end and lower end of the dielectric elastomer sensor element 11 in opposite directions to each other in the circumferential direction is applied. In response to the external force F2, the dielectric elastomer layer 111 is deformed so as to be twisted, and the size and relative distance of the pair of electrode layers 112 change. The capacitance C of the dielectric elastomer sensor element 11 thereby changes, and the frequency of the AC electrical signal serving as the output signal of the oscillation circuit 1 changes. The application of an external force deforming the dielectric elastomer sensor element 11 can be recognized when it is determined by the determination circuit 2 that the capacitance C has changed. Note that, in this example, it is not necessarily specified whether the change in the capacitance C is an increase or decrease relative to the initial capacitance C0, although, in the case where deformation accompanied by a change in the capacitance C occurs in the dielectric elastomer sensor element 11, this phenomenon can be determined by the intermediate circuit 3.

Figure 7:
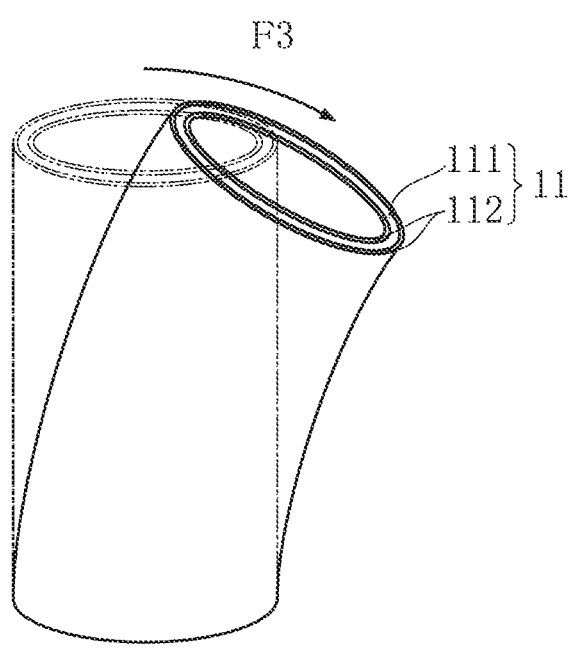
FIG. 7 is a perspective diagram showing a state in which one example of the dielectric elastomer sensor element of the dielectric elastomer sensor system of FIG. 1 receives yet another external force.

In the example shown in FIG. 7, an external force F3 (so-called bending moment) that bends the upper end of the dielectric elastomer sensor element 11 toward the lower end is applied. In response to the external force F3, the dielectric elastomer layer 111 is deformed so as to be bent, and the size and relative distance of the pair of electrode layers 112 change. The capacitance C of the dielectric elastomer sensor element 11 thereby changes, and the frequency of the AC electrical signal serving as the output signal of the oscillation circuit 1 changes. The application of an external force deforming the dielectric elastomer sensor element 11 can be recognized when it is determined by the determination circuit 2 that the capacitance Chas changed. Note that similarly, in this example, it is not necessarily specified whether the change in the capacitance C is an increase or decrease relative to the initial capacitance C0.

Figure 8:
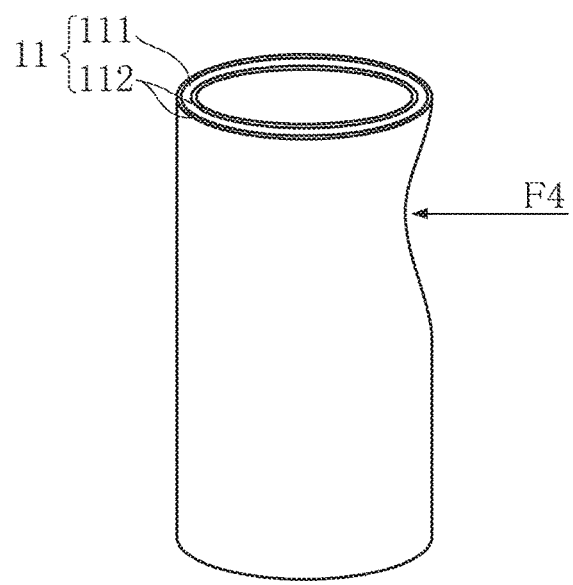
FIG. 8 is a perspective diagram showing a state in which one example of the dielectric elastomer sensor element of the dielectric elastomer sensor system of FIG. 1 receives yet another external force.

In the example shown in FIG. 8, an external force F4 that depresses part of the dielectric elastomer sensor element 11 is applied. Deformation by such an external force F4 can occur due to factors such as the relationship between the overall size and thickness of the dielectric elastomer layer 111 of the dielectric elastomer sensor element 11 or the existence of a member (not shown) that partially constrains the dielectric elastomer layer 111. Similarly, due to such deformation, the size and relative distance of the pair of electrode layers 112 can change, and the capacitance C can change. The application of an external force deforming the dielectric elastomer sensor element 11 can be recognized when it is determined by the determination circuit 2 that the capacitance C has changed. Note that similarly, in this example, it is not necessarily specified whether the change in the capacitance C is an increase or decrease relative to the initial capacitance C0.

As evident from the examples shown in FIGS. 5 to 8, the external forces F1 to F4 that are applied to the dielectric elastomer sensor element 11 include external forces of at least two mutually different directions. An external force in the present invention is a concept that is not limited to simple tensile force and compressive force, and includes bending moments, twisting moments and the like, and these are defined as external forces of mutually different directions. Also, the external force is not limited to external forces that are applied to the entire dielectric elastomer sensor element 11 such as the external forces F1 to F3, and external forces that are applied to part of the dielectric elastomer sensor element 11 such as the external force F4 is included.

Next, operation of the dielectric elastomer sensor system A1 will be described.

According to the present embodiment, in the case where external forces of at least two mutually different directions are applied, a change in the capacitance C can be determined by the determination circuit 2, and application of an external force can be recognized, if any of the external forces are applied. By arranging one dielectric elastomer sensor element 11 in a certain location, application of external forces of at least two mutually different directions to that location can thereby be detected using the one dielectric elastomer sensor element 11. Accordingly, high functionality of the dielectric elastomer sensor system A1 can be attained.

By making the dielectric elastomer layer 111 cylindrical in shape, detection is possible even if the external force is a twisting moment (external force F2) or a bending moment (external force F3), other than the case where the external force is a simple tensile force or compressive force (external force F1). Also, even the external force F4 that deforms the dielectric elastomer sensor element 11 locally can be included as a detection target.

FIGS. 9 to 18 show other embodiments of the present invention. Note that, in these diagrams, the same reference signs as the above embodiment are given to elements that are the same as or similar to the above embodiment.

Figure 9:
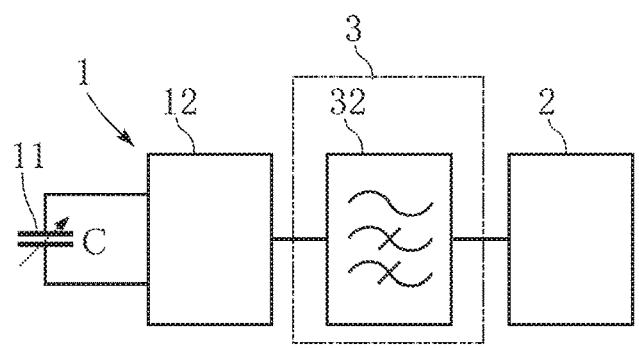
FIG. 9 is a system configuration diagram schematically showing a dielectric elastomer sensor system that is based on a second embodiment of the present invention.

FIG. 9 shows a dielectric elastomer sensor system that is based on a second embodiment of the present invention. A dielectric elastomer sensor system A2 of the present embodiment differs from the abovementioned embodiment in terms of the configuration of the intermediate circuit 3. In the present embodiment, the intermediate circuit 3 has only the filter circuit 32. Such a configuration can be adopted in the case where the determination circuit 2 determines the output signal from the oscillation drive unit 12 directly as the AC signal.

Figure 10:
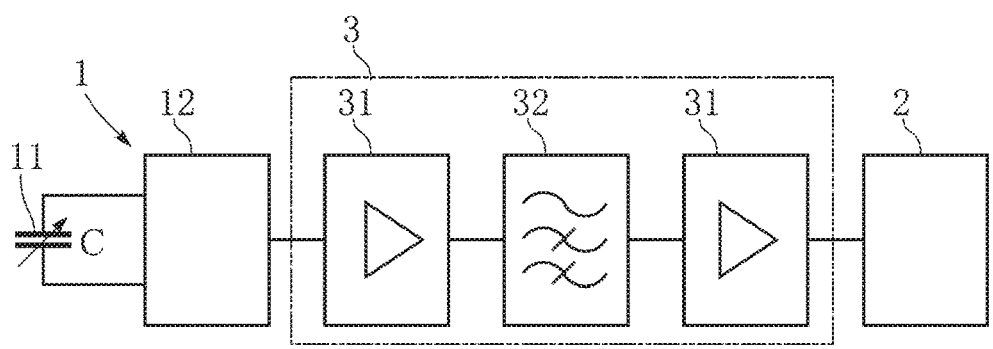
FIG. 10 is a system configuration diagram schematically showing a dielectric elastomer sensor system that is based on a third embodiment of the present invention.

FIG. 10 shows a dielectric elastomer sensor system that is based on a third embodiment of the present invention. In the dielectric elastomer sensor system A3 of the present embodiment, the intermediate circuit 3 is configured with an AC amplification circuit 31, a filter circuit 32 and an AC amplification circuit 31 connected in this order. Similarly, in the present embodiment, such a configuration can be adopted in the case where the determination circuit 2 determines the output signal from the oscillation drive unit 12 directly as the AC signal.

Figure 11:
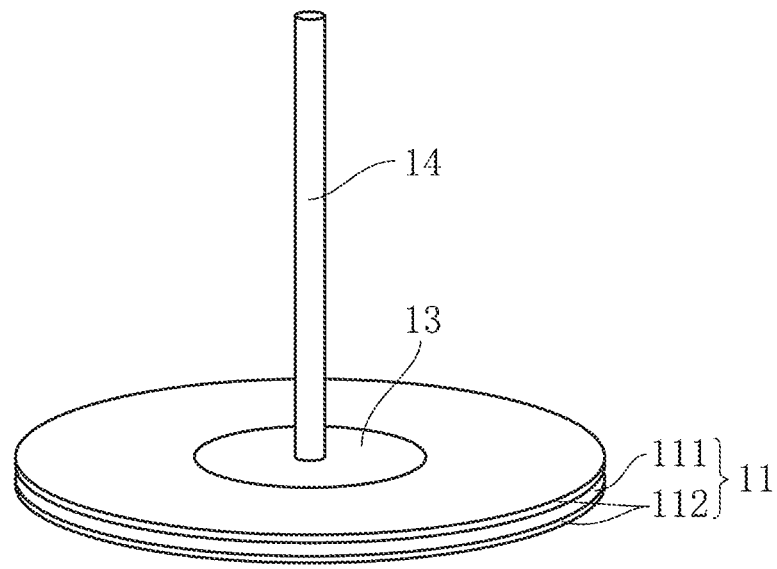
FIG. 11 is a perspective diagram showing the dielectric elastomer sensor element of a dielectric elastomer sensor system that is based on a fourth embodiment of the present invention.

FIG. 11 shows the dielectric elastomer sensor element 11 of a dielectric elastomer sensor system that is based on a fourth embodiment of the present invention. In the present embodiment, a support part 13 and a rod 14 are attached to the dielectric elastomer sensor element 11.

The dielectric elastomer sensor element 11 of the present embodiment is formed to be ring-like in plan view, and, in the illustrated example, is formed in a circular ring shape. The support part 13 is a plate-like member having a circular shape in plan view, for example, and has a higher rigidity than the dielectric elastomer sensor element 11. The material of the support part 13 is not particularly limited, and a resin, a metal that has undergone insulation processing or the like are used as appropriate. The inner edge of the dielectric elastomer sensor element 11 is fixed to the outer edge of the support part 13. Also, the outer edge of the dielectric elastomer sensor element 11 is fixed to a fixed member that is not illustrated.

The rod 14 is a long, thin bar-like member, and one end is fixed to the support part 13. The other end of the rod 14 is a so-called free end. The material of the rod 14 is not particularly limited, and a resin or a metal are employed as appropriate.

Figure 12:
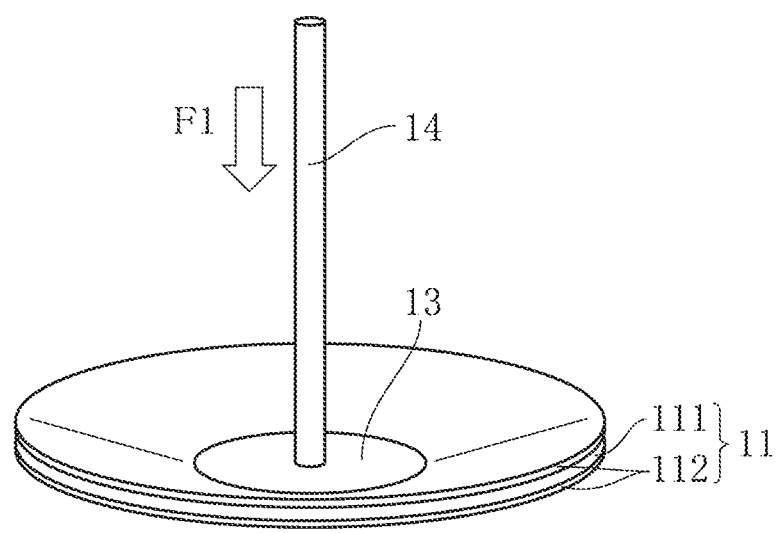
FIG. 12 is a perspective diagram showing a state in which the dielectric elastomer sensor element of the dielectric elastomer sensor system that is based on the fourth embodiment of the present invention receives an external force.
Figure 13:
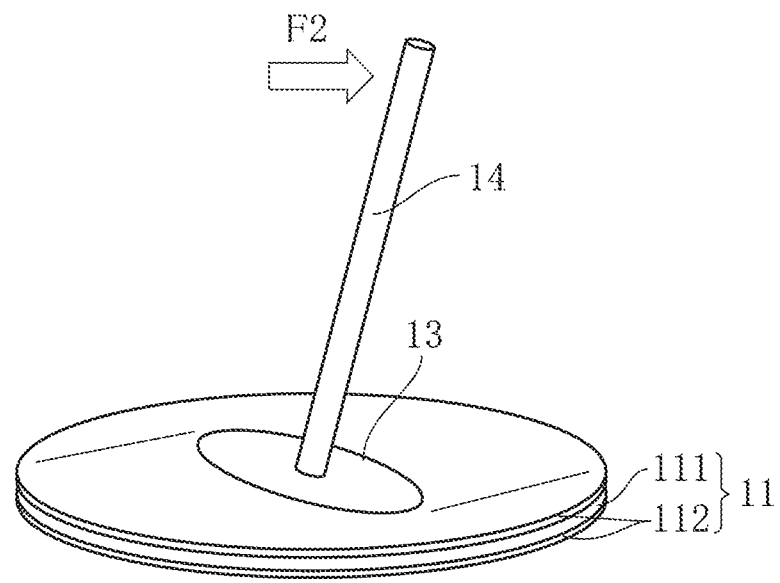
FIG. 13 is a perspective diagram showing a state in which the dielectric elastomer sensor element of the dielectric elastomer sensor system that is based on the fourth embodiment of the present invention receives another external force.
Figure 14:
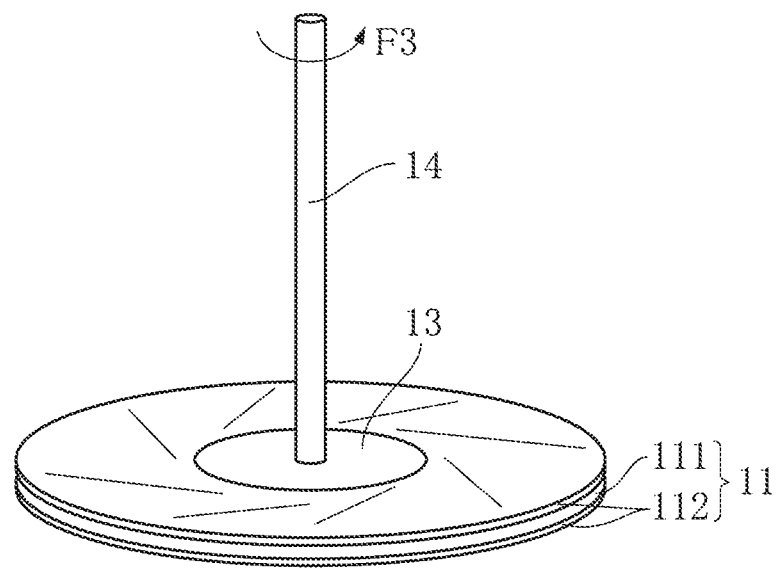
FIG. 14 is a perspective diagram showing a state in which the dielectric elastomer sensor element of the dielectric elastomer sensor system that is based on the fourth embodiment of the present invention receives yet another external force.

FIGS. 12 to 14 illustrate cases where the capacitance C changes due to the dielectric elastomer sensor element 11 of the present embodiment receiving an external force. In the example shown in FIG. 12, an external force F1 that pushes the rod 14 longitudinally is applied. The rod 14 and the support part 13 are thereby pushed downward in the diagram, and deformation involving the inner edge of the dielectric elastomer sensor element 11 falling below the outer edge occurs. Due to this deformation, the capacitance C of the dielectric elastomer sensor element 11 changes, and the frequency of the AC electrical signal serving as the output signal of the oscillation circuit 1 changes. The application of an external force deforming the dielectric elastomer sensor element 11 can be recognized when it is determined by the determination circuit 2 that the capacitance C has changed.

In the example shown in FIG. 13, an external force F2 that pushes the upper end of the rod 14 horizontally is applied. The rod 14 thereby exhibits the behavior of falling to the right in the diagram, and a so-called moment is applied to the support part 13. As a result, the dielectric elastomer sensor element 11 deforms such that the left side portion of the inner edge rises, and the right side portion falls. Due to this deformation, the capacitance C of the dielectric elastomer sensor element 11 changes, and the frequency of the AC electrical signal serving as the output signal of the oscillation circuit 1 changes. The application of an external force deforming the dielectric elastomer sensor element 11 can be recognized when it is determined by the determination circuit 2 that the capacitance C has changed.

In the example shown in FIG. 14, a force that twists the rod 14 circumferentially is applied, this being an external force F3. In this case, the rod 14 and the support part 13 are rotated, and the dielectric elastomer sensor element 11 is twisted and deformed such that the inner edge of the dielectric elastomer sensor element 11 rotates relative to the outer edge. Due to this deformation, the capacitance C of the dielectric elastomer sensor element 11 changes, and the frequency of the AC electrical signal serving as the output signal of the oscillation circuit 1 changes. The application of an external force deforming the dielectric elastomer sensor element 11 can be recognized when it is determined by the determination circuit 2 that the capacitance C has changed. Similarly, with such an embodiment, it is possible to detect application of external forces of at least two mutually different directions using one dielectric elastomer sensor element 11. Accordingly, high functionality of the dielectric elastomer sensor system can be attained.

Figure 15:
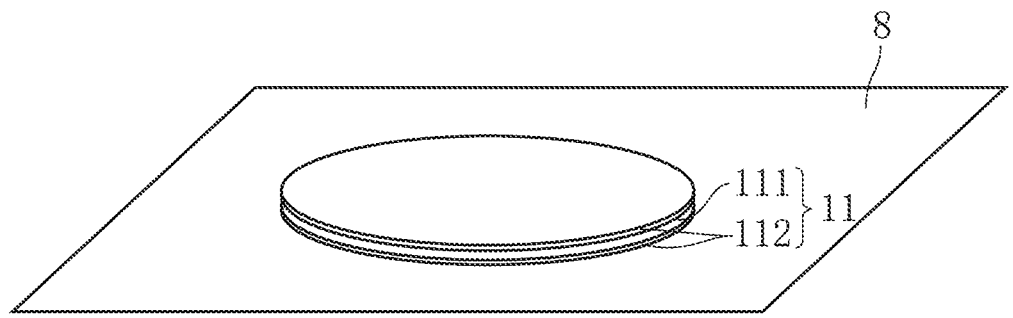
FIG. 15 is a perspective diagram showing the dielectric elastomer sensor element of a dielectric elastomer sensor system that is based on a fifth embodiment of the present invention.

FIG. 15 shows the dielectric elastomer sensor element 11 of a dielectric elastomer sensor system that is based on a fifth embodiment of the present invention. In the present embodiment, the dielectric elastomer sensor element 11 is stuck to a detection object 8 throughout its entirety. The detection object 8 is an object in which various types of deformation can occur, and the occurrence of deformation thereof is detected using the dielectric elastomer sensor element 11. The shape of the dielectric elastomer sensor element 11 is not particularly limited, and, in the case of the detection configuration of the present embodiment, is preferably circular, for example.

Figure 16:
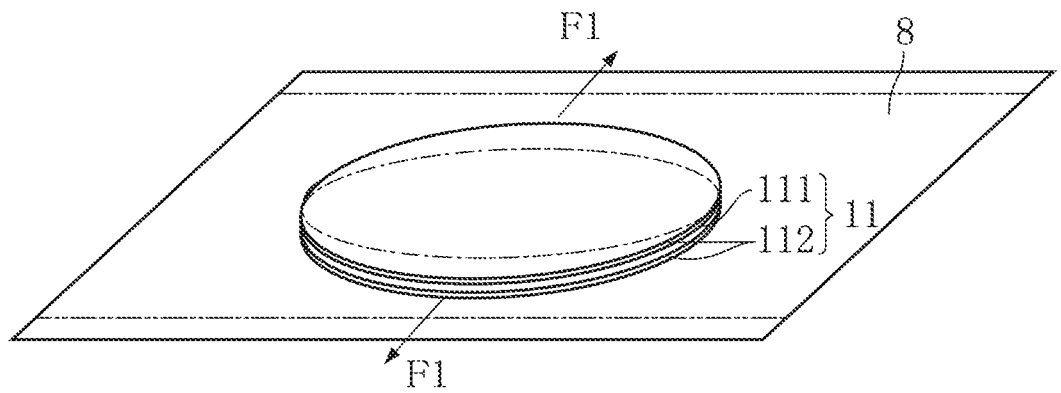
FIG. 16 is a perspective diagram showing a state in which the dielectric elastomer sensor element of the dielectric elastomer sensor system that is based on the fifth embodiment of the present invention receives an external force.
Figure 17:
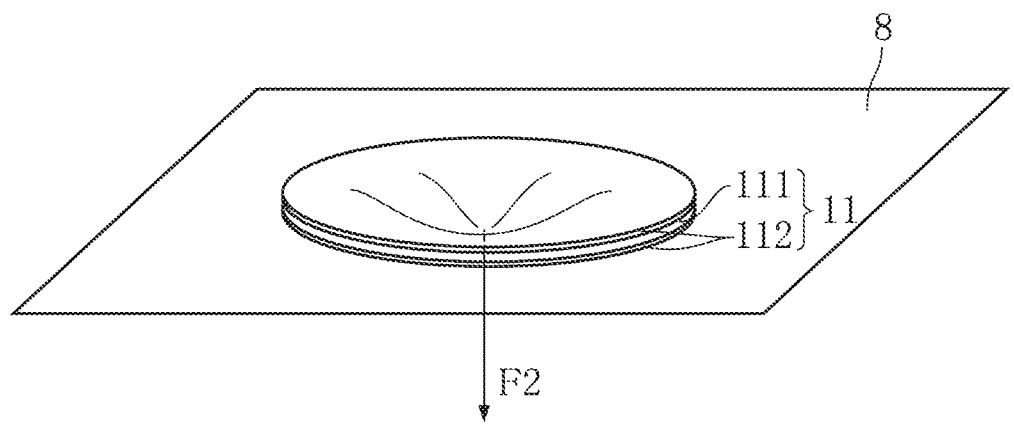
FIG. 17 is a perspective diagram showing a state in which the dielectric elastomer sensor element of the dielectric elastomer sensor system that is based on the fifth embodiment of the present invention receives another external force.
Figure 18:
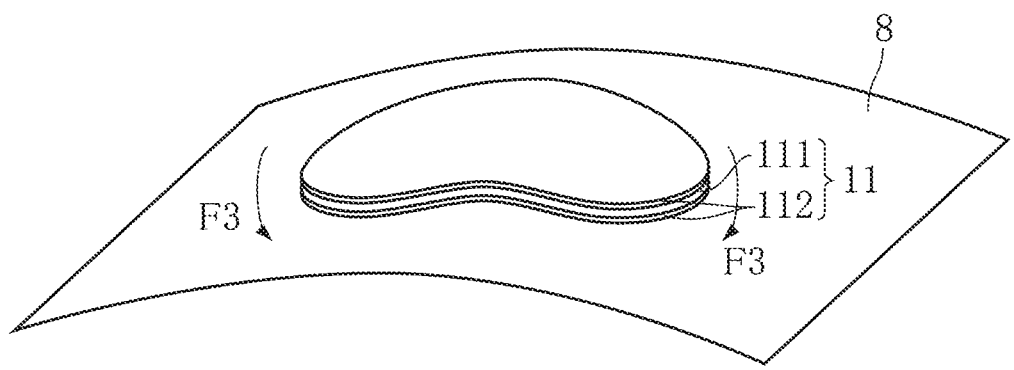
FIG. 18 is a perspective diagram showing a state in which the dielectric elastomer sensor element of the dielectric elastomer sensor system that is based on the fifth embodiment of the present invention receives yet another external force.

FIGS. 16 to 18 illustrate the case where the capacitance C changes due to the dielectric elastomer sensor element 11 of the present embodiment receiving an external force. In the example shown in FIG. 16, the detection object 8 is deformed so as to stretch toward the near side and far side in the diagram. An external force F1 that stretches the dielectric elastomer sensor element 11 toward the near side and far side is thereby applied to the dielectric elastomer sensor element 11. Due to this deformation, the capacitance C of the dielectric elastomer sensor element 11 changes, and the frequency of the AC electrical signal serving as the output signal of the oscillation circuit 1 changes. The application of an external force deforming the dielectric elastomer sensor element 11 can be recognized when it is determined by the determination circuit 2 that the capacitance C has changed.

In the example shown in FIG. 17, the detection object 8 is deformed such that part thereof is depressed. An external force F2 that depresses part of the dielectric elastomer sensor element 11 is thereby applied to the dielectric elastomer sensor element 11. Due to this deformation, the capacitance C of the dielectric elastomer sensor element 11 changes, and the frequency of the AC electrical signal serving as the output signal of the oscillation circuit 1 changes. The application of an external force deforming the dielectric elastomer sensor element 11 can be recognized when it is determined by the determination circuit 2 that the capacitance C has changed.

In the example shown in FIG. 18, the detection object 8 is deformed such that a middle portion thereof in the left-right direction in the diagram is raised. An external force F3 that bends the dielectric elastomer sensor element 11 such that the middle portion in the left-right direction rises and both ends fall is thereby applied to the dielectric elastomer sensor element 11. Due to this deformation, the capacitance C of the dielectric elastomer sensor element 11 changes, and the frequency of the AC electrical signal serving as the output signal of the oscillation circuit 1 changes. The application of an external force deforming the dielectric elastomer sensor element 11 can be recognized when it is determined by the determination circuit 2 that the capacitance C has changed. Similarly, with such an embodiment, it is possible to detect application of external forces of at least two mutually different directions using one dielectric elastomer sensor element 11. Accordingly, high functionality of the dielectric elastomer sensor system can be attained.

The dielectric elastomer sensor system according to the present invention is not limited to the abovementioned embodiments. Various design changes can be freely made to the specific configuration of respective parts of the dielectric elastomer sensor system according to the invention.

The invention claimed is:
1. A dielectric elastomer sensor system comprising:
   an oscillation circuit including a dielectric elastomer sensor element having a sensor body constituted by a dielectric elastomer layer and a pair of electrode layers that sandwich the dielectric elastomer layer; and a determination circuit configured to determine a change in a capacitance of the dielectric elastomer sensor element, based on an output signal from the oscillation circuit, wherein the dielectric elastomer sensor element has a cylindrical shape with one of the pair of the electrode layers being on an inner circumferential side and the other of the pair of the electrode layers being on an outer circumferential side, and changes in capacitance with deformation, and the deformation includes two or more of elongation in an axial direction, compression deformation in the axial direction, twisting deformation, bending deformation, and depression deformation of an outer circumferential surface, with at least one of the twisting deformation, the bending deformation, and the depression deformation of the outer circumferential surface.

2. The dielectric elastomer sensor system according to claim 1, further comprising:

an intermediate circuit including a filter circuit that attenuates a predetermined frequency of the output signal of the oscillation circuit, and configured to output the output signal of the oscillation circuit processed by the filter circuit to the determination circuit.

3. The dielectric elastomer sensor system according to claim 1, wherein the dielectric elastomer layer has a circular ring-shaped cross-section.

4. A dielectric elastomer sensor system comprising:

an oscillation circuit including a dielectric elastomer sensor element having a sensor body constituted by a dielectric elastomer layer and a pair of electrode layers that sandwich the dielectric elastomer layer; and a determination circuit configured to determine a change in a capacitance of the dielectric elastomer sensor element, based on an output signal from the oscillation circuit, wherein the dielectric elastomer sensor element is formed in a circular ring shape in plan view, the dielectric elastomer sensor element includes an external force action member provided in a middle opening part thereof and has an outer edge integrally formed with an inner edge of the middle opening part, and changes in capacitance with deformation, and the deformation includes two or more of deformation of the sensor body caused by rising or falling of the external force action member, deformation of the sensor body caused by inclination of the external force action member, and deformation of the sensor body caused by rotation of the external force action member with at least one of the deformation of the sensor body caused by the inclination of the external force action member and the deformation of the sensor body caused by the rotation of the external force action member.

5. A dielectric elastomer sensor element comprising:

a sensor body constituted by a dielectric elastomer layer and a pair of electrode layers that sandwich the dielectric elastomer layer, wherein the dielectric elastomer sensor element changes in capacitance due to deformation caused by external forces of at least two mutually different directions, the sensor body has a cylindrical shape with one of the pair of the electrode layers being on an inner circumferential side and the other of the pair of the electrode layers being on an outer circumferential side, and changes in capacitance with deformation, and the deformation includes two or more of elongation in an axial direction, compression deformation in the axial direction, twisting deformation, bending deformation, and depression deformation of an outer circumferential surface with at least one of the twisting deformation, the bending deformation, and the depression deformation of the outer circumferential surface.

6. A dielectric elastomer sensor element comprising:

a sensor body constituted by a dielectric elastomer layer and a pair of electrode layers that sandwich the dielectric elastomer layer, wherein the sensor body is formed in a circular ring shape in plan view, the sensor body includes an external force action member provided in a middle opening part thereof and has an outer edge integrally formed with an inner edge of the middle opening part, and changes in capacitance with deformation, and the deformation includes two or more of deformation of the sensor body caused by rising or falling of the external force action member, deformation of the sensor body caused by inclination of the external force action member, and deformation of the sensor body caused by rotation of the external force action member, with at least one of the deformation of the sensor body caused by the inclination of the external force action member and the deformation of the sensor body caused by the rotation of the external force action member.

* * * * *